United States Patent
Zevenbergen et al.

(10) Patent No.: US 9,205,558 B1
(45) Date of Patent: Dec. 8, 2015

(54) MULTIPLE SUCTION CUP CONTROL

(71) Applicant: Google Inc., Mountain View, CA (US)

(72) Inventors: John Zevenbergen, San Francisco, CA (US); Ethan Rublee, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/333,288

(22) Filed: Jul. 16, 2014

(51) Int. Cl.
*B25J 15/06* (2006.01)
*B25J 9/16* (2006.01)

(52) U.S. Cl.
CPC .............. *B25J 9/1664* (2013.01); *B25J 9/1633* (2013.01); *B25J 15/0616* (2013.01); *Y10S 901/09* (2013.01); *Y10S 901/40* (2013.01); *Y10S 901/46* (2013.01)

(58) Field of Classification Search
CPC ..... Y10S 901/01; B25J 5/007; B25J 15/0616; B25J 13/08; B25J 9/1664; B66F 9/181
USPC ........... 294/65, 907, 183–189; 901/1, 40, 46, 901/47, 15, 17; 414/627, 730, 736, 737
See application file for complete search history.

(56) References Cited

U.S. PATENT DOCUMENTS

| | | | |
|---|---|---|---|
| 3,716,147 A * | 2/1973 | Pipes | 414/21 |
| 4,252,497 A * | 2/1981 | Burt | 414/627 |
| 4,741,567 A | 5/1988 | Zimmer et al. | |
| 5,125,706 A * | 6/1992 | Kuwaki et al. | 294/65 |
| 5,201,560 A * | 4/1993 | Golden | 294/64.2 |
| 5,429,009 A * | 7/1995 | Wolfe et al. | 73/865.8 |
| 5,609,377 A * | 3/1997 | Tanaka | 294/65 |
| 5,967,739 A * | 10/1999 | Bennison | 414/744.3 |
| 6,024,392 A | 2/2000 | Blatt | |
| 6,394,519 B1 * | 5/2002 | Byers et al. | 294/185 |
| 6,652,014 B2 * | 11/2003 | Schmalz et al. | 294/65 |
| 6,817,639 B2 * | 11/2004 | Schmalz et al. | 294/185 |
| 7,017,961 B1 * | 3/2006 | Parnell et al. | 294/2 |
| 7,185,603 B2 * | 3/2007 | Correa et al. | 119/6.8 |
| 7,296,834 B2 * | 11/2007 | Clark et al. | 294/65 |
| 7,481,472 B2 * | 1/2009 | Cawley et al. | 294/2 |
| 7,665,949 B2 * | 2/2010 | Pearce | 414/627 |
| 7,677,622 B2 * | 3/2010 | Dunkmann et al. | 294/65 |
| 8,146,972 B2 * | 4/2012 | Petijean | 294/186 |

(Continued)

FOREIGN PATENT DOCUMENTS

WO    2013137717    9/2013

*Primary Examiner* — Gabriela Puig
(74) *Attorney, Agent, or Firm* — McDonnell Boehnen Hulbert & Berghoff LLP

(57) ABSTRACT

Example embodiments may provide for control of a suction gripper with multiple suction cups. One example system includes a suction gripper and a control system. The suction gripper may include a vacuum pump, a plurality of suction cups coupled to the vacuum pump, and a plurality of sensors corresponding to the suction cups, where a sensor is positioned between the vacuum pump and a suction cup and measures a vacuum pressure of the suction cup. The control system may be configured to activate the vacuum pump to cause the suction gripper to apply suction to an object through one or more active suction cups, receive sensor data indicative of the vacuum pressure of the one or more active suction cups from the corresponding sensors, identify at least one suction cup to deactivate from the one or more active suction cups, and deactivate the at least one identified suction cup.

22 Claims, 10 Drawing Sheets

(56) References Cited

U.S. PATENT DOCUMENTS

| | | |
|---|---|---|
| 8,381,501 B2 | 2/2013 | Koselka et al. |
| 8,494,672 B2 | 7/2013 | Chirnomas |
| 8,560,121 B2 | 10/2013 | Hjomet |
| 8,678,776 B2 * | 3/2014 | Medow et al. .................. 417/53 |
| 2005/0008470 A1 * | 1/2005 | Baclija et al. ................ 414/736 |
| 2005/0226711 A1 | 10/2005 | Schnoor et al. |
| 2008/0077276 A1 * | 3/2008 | Montero Sanjuan et al. . 700/245 |
| 2009/0066098 A1 * | 3/2009 | Subotincic ...................... 294/65 |
| 2010/0040450 A1 * | 2/2010 | Parnell ....................... 414/752.1 |
| 2011/0115243 A1 * | 5/2011 | Desai et al. ...................... 294/65 |
| 2013/0064635 A1 | 3/2013 | Kirchdoerffer |
| 2013/0129464 A1 * | 5/2013 | Regan et al. .................. 414/800 |
| 2013/0236285 A1 * | 9/2013 | Maurissen et al. ............ 414/800 |
| 2014/0067121 A1 | 3/2014 | Brooks et al. |
| 2014/0277721 A1 * | 9/2014 | Tomo et al. .................... 700/253 |
| 2015/0037131 A1 * | 2/2015 | Girtman et al. ............... 414/797 |

* cited by examiner

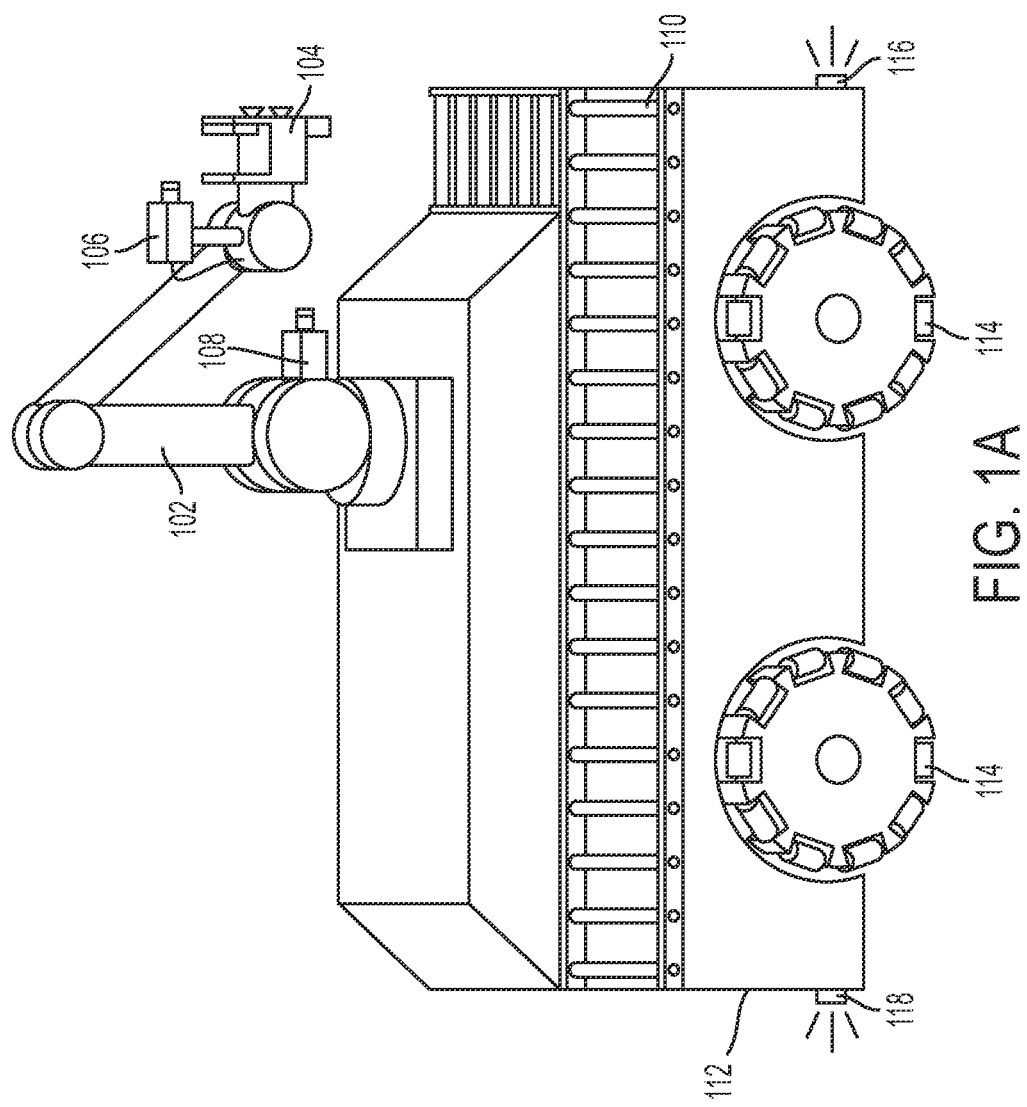

MULTIPLE SUCTION CUP CONTROL

BACKGROUND

Unless otherwise indicated herein, the materials described in this section are not prior art to the claims in this application and are not admitted to be prior art by inclusion in this section.

Robotic systems, such as a robotic arm containing a gripping component, may be used for applications involving picking up or moving objects. For instance, a robotic device may be used to fill a container with objects, create a stack of objects, or unload objects from a truck bed. In some cases, all of the objects may be of the same type. In other cases, a container or truck may contain a mix of different types of objects, such as boxed items, cans, tires, or other stackable objects. Such robotic systems may direct a robotic arm to pick up objects based on predetermined knowledge of where objects are in the environment.

SUMMARY

The present disclosure provides methods and apparatuses that may provide for control of a suction gripper that includes a plurality of suction cups. A vacuum pump may be controlled to apply suction to an object through one or more active suction cups of the suction gripper in order to cause the gripper to grip the object. Digital or analog sensors corresponding to the suction cups may then be used to measure the vacuum pressures of one or more of the active suction cups. Based on sensor data from the digital or analog sensors, a control system may identify one or more of the active suction cups to be deactivated.

In one example, a system including a suction gripper and a control system is disclosed. The suction gripper may include a vacuum pump, a plurality of suction cups coupled to the vacuum pump, and a plurality of sensors corresponding to the suction cups, where a sensor is positioned between the vacuum pump and a corresponding one of the suction cups and measures a vacuum pressure of the corresponding one of the suction cups. The control system may be configured to activate the vacuum pump to cause the suction gripper to apply suction to an object through one or more active suction cups from the plurality of suction cups, receive sensor data indicative of the vacuum pressure of the one or more active suction cups from the corresponding sensors, based on the received sensor data, identify at least one suction cup to deactivate from the one or more active suction cups, and deactivate the at least one identified suction cup.

In another example, a method is provided that includes activating a vacuum pump to cause a suction gripper to apply suction to an object through one or more suction cups of the suction gripper. The method may further include receiving sensor data indicative of a vacuum pressure of the one or more suction cups from one or more sensors corresponding to the one or more suction cups, where a sensor is positioned between the vacuum pump and a corresponding one of the suction cups and determines the vacuum pressure of the corresponding one of the suction cups. Based on the received sensor data, the method may also include identifying, by a computing device, at least one suction cup to deactivate from the one or more suction cups. The method may additionally include deactivating the at least one identified suction cup.

In another example, a non-transitory computer readable medium having stored therein instructions, that when executed by a computing system, cause the computing system to perform functions is disclosed. The functions may include activating a vacuum pump to cause a suction gripper to apply suction to an object through one or more suction cups of the suction gripper. The functions may further include receiving sensor data indicative of a vacuum pressure of the one or more suction cups from one or more sensors corresponding to the one or more suction cups, where a sensor is positioned between the vacuum pump and a corresponding one of the suction cups and determines the vacuum pressure of the corresponding one of the suction cups. Based on the received sensor data, the functions may also include identifying at least one suction cup to deactivate from the one or more suction cups. The functions may additionally include deactivating the at least one identified suction cup.

In yet another example, a system may include means for activating a vacuum pump to cause a suction gripper to apply suction to an object through one or more suction cups of the suction gripper. The system may further include means for receiving sensor data indicative of a vacuum pressure of the one or more suction cups from one or more sensors corresponding to the one or more suction cups, where a sensor is positioned between the vacuum pump and a corresponding one of the suction cups and determines the vacuum pressure of the corresponding one of the suction cups. Based on the received sensor data, the system may also include means for identifying at least one suction cup to deactivate from the one or more suction cups. The system may additionally include means for deactivating the at least one identified suction cup.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 1A shows a robotic arm mounted on a moveable cart, according to an example embodiment.

DETAILED DESCRIPTION

Figure 1B:
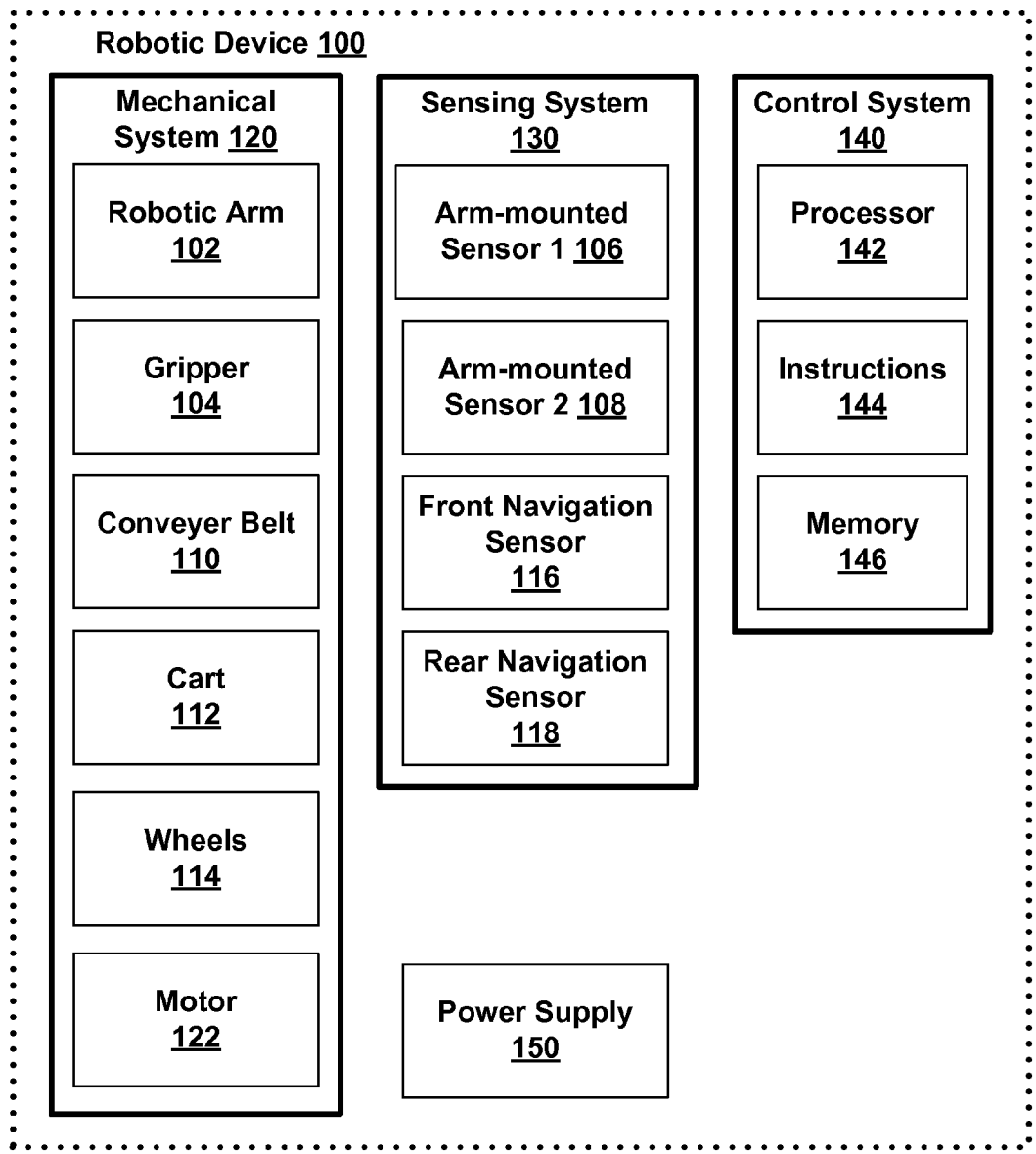
FIG. 1B is a functional block diagram illustrating a robotic device, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Example embodiments may provide for control of a suction gripper with multiple suction cups. A robotic manipulator (e.g., a robotic arm) may be equipped with such a gripper in order to pick up and/or move objects, such as boxes. An example suction gripper may include multiple suction cups that are capable of attaching to an object. In order to grip an object, the suction gripper may apply suction to the object through one or more active suction cups that are adjacent to or connected to a surface of the object. In some examples, a common vacuum pump may be used to apply suction through the active suction cups. In further examples, different subsets of available suction cups may be activated to grip a particular object while other suction cups are deactivated.

Within examples, analog or digital sensors may be used to measure vacuum pressure of individual suction cups of the suction gripper. More specifically, an analog or digital sensor may be placed in line between a particular suction cup and the common vacuum pump in order to determine a level of usage of the particular suction cup. In further examples, a control system may use sensor data from the in-line sensors to identity one or more suction cups to deactivate (e.g., by closing one or more valves to prevent the vacuum pump from applying suction through the deactivated suction cups). By deactivating one or more suction cups, the gripper may apply greater suction force to a gripped object through the remaining active suction cups.

In an example embodiment, a control system may first determine an orientation to position the suction onto an object so that one or more of the suction cups contact the object. For instance, the control system may use optical sensor data from one or more optical sensors indicating the size and shape of the object to determine how to position the gripper. The control system may then activate the suction cups in contact with the object to apply suction to the object. The in-line sensors may then provide sensor data to the control system indicating the vacuum pressure of each of the active suction cups. The control system may use the vacuum pressure measurements of the individual suction cups to modify the set of active suction cups used to grip the object.

In some examples, the control system may deactivate a certain number of suction cups with the lowest vacuum pressures from the group of active suction cups. For instance, ten suction cups may initially be activated to grip an object, and then the two suction cups with the lowest vacuum pressures out of the ten may be deactivated. In other examples, any active suction cup with a vacuum pressure below a certain threshold level (e.g., below 10 inches of mercury or below 20 inches of mercury) may be deactivated. In further examples, the sensors may help to identify and deactivate suction cups that have failed to achieve good suction (e.g., when suction cups have not been positioned correctly to grip an object or when a particular surface of the object is difficult to grip).

In additional examples, the control system may deactivate one or more of the suction cups in an effort to maximize the overall gripping force applied by the suction gripper to the object. For instance, the control system may predict the gripping force that will be achieved by the gripper when activating different subsets of suction cups based on the current levels of vacuum pressure of individual cups. In further examples, after deactivating one or more suction cups, the control system may receive additional sensor data from the in-line sensors indicative of the vacuum pressure of the remaining active suction cups. In some examples, the control system may then deactivate additional suction cups and/or reactivate certain deactivated suction cups to further optimize the gripping force of the suction gripper.

In additional examples, sensor data indicating the vacuum pressure of individual suction cups may be received and stored for multiple uses of the suction gripper to pick up and/or move objects. In some examples, this sensor data received over time may be used to identify one or more suction cups for replacement. For instance, if the sensor data indicates repeated poor performance of a particular suction cup (e.g., the top left suction cup) and/or the control system often deactivates the particular suction cup while picking objects, the suction cup may be flagged to be replaced by a new suction cup.

Within examples, a suction gripper may be coupled to a robotic device and used by the robotic device to pick up and/or move objects. In some examples, a trajectory may be determined to move an object without causing the suction gripper to drop the object (e.g., by moving too fast and/or creating too great a force on the gripper). In additional examples, the trajectory may be determined based in part on a measure of the total gripping force applied by the suction gripper to the object, which may be estimated based on the vacuum pressures of individual active suction cups.

In some examples, the robotic device may also be equipped with a force-torque sensor for measuring forces on the gripper. In further examples, data from a force-torque sensor may be used to determine or modify a trajectory to prevent the suction gripper from dropping the object by comparing the gripping force applied by the suction gripper to the object with the measured forces on the gripper resulting from movement through a given trajectory.

In additional examples, sensor data from the in-line sensors of the suction gripper may be used to refine gripping strategies for moving objects in the future. For instance, the positioning of the gripper and/or suction cups for gripping different types of objects may be improved over time based on past performance of the gripper and/or suction cups. In further examples, which suction cups are activated for different types of objects may be adjusted over time as well or instead. In some examples, one or more machine learning algorithms may be used with data feedback from the in-line sensors of the suction gripper to determine or refine future gripping strategies as well.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

According to various embodiments, described herein are methods and systems for automated loading and/or unloading of boxes and/or other objects, such as into a storage container or from a vehicle. In some example embodiments, boxes or objects may be automatically organized and placed onto pallets. Within examples, automating the process of loading/unloading trucks and/or the process of creating pallets from objects for easier storage and transport may provide a number of industrial and business advantages.

According to various embodiments, automating the process of loading/unloading trucks and/or the process of creating pallets may include the incorporation of one or more robotic devices to move objects or perform other functions. In some embodiments, a robotic device can be made mobile by coupling with a wheeled base, a holonomic base (e.g., a base that can move in any direction), or rails on the ceiling, walls or floors. In some embodiments, the base can be an elevated base.

In some examples, a system including one or more sensors, one or more computers, and one or more robotic arms is described. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

As used herein, the term "boxes" will refer to any object or item that can be placed onto a pallet or loaded onto or unloaded from a truck or container. For example, in addition to rectangular solids, "boxes" can refer to cans, drums, tires or any other "simple" shaped geometric items. Additionally, "loading" and "unloading" can each be used to imply the other. For example, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Of course, examples herein may be applied toward objects other than boxes as well, and toward objects of various sizes and shapes.

According to various embodiments, a robotic manipulator may be mounted on a holonomic cart (e.g., a cart with wheels that allow the cart to move in any direction). FIG. 1A depicts an exemplary holonomic cart containing a robotic manipulator. In some embodiments, a moveable cart 112 may include a robotic arm 102 mounted on the cart 112. The robotic arm 102 may contain a gripping component 104 for gripping objects within the environment. The cart may contain one or more wheels 114, which may be holonomic wheels that operate with two degrees of freedom. In further embodiments, a wrap around front conveyor belt 110 may be included on the holonomic cart 112. In some examples, the wrap around front conveyer belt may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In other example embodiments, one or more robotic manipulators may be mounted on rails of a truck or container. In such examples, the robotic manipulators may be used to load or unload the truck or container.

FIG. 1B is a functional block diagram illustrating a robotic device 100, according to an example embodiment. The robotic device 100 could include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described functions of the robotic device 100 may be divided up into additional functional or physical components, or combined into fewer functional or physical components. In some further examples, additional functional and/or physical components may be added to the examples illustrated by FIGS. 1A and 1B.

The mechanical system 120 may include components described above with respect to FIG. 1A, including a robotic an 102, a gripper 104, a conveyer belt 110, a (movable or holonomic) cart 112, and one or more wheels 114. The mechanical system 120 may additionally include a motor 122, which may be an electric motor powered by electrical power, or may be powered by a number of different energy sources, such as a gas-based fuel or solar power. Additionally, motor 122 may be configured to receive power from power supply 150. The power supply 150 may provide power to various components of robotic device 100 and could represent, for example, a rechargeable lithium-ion or lead-acid battery. In an example embodiment, one or more banks of such batteries could be configured to provide electrical power. Other power supply materials and types are also possible.

The sensing system 130 may use one or more sensors attached to a robotic arm 102, such as sensor 106 and sensor 108, which may be 2D sensors and/or 3D depth sensors that sense information about the environment as the robotic arm 102 moves. The sensing system may determine information about the environment that can be used by control system 140 (e.g., a computer running motion planning software) to pick and move boxes efficiently. The control system 140 could be located on the device or could be in remote communication with the device. In further examples, scans from one or more 2D or 3D sensors with fixed mounts on a mobile base, such as a front navigation sensor 116 and a rear navigation sensor 118, and one or more sensors mounted on a robotic arm, such as sensor 106 and sensor 108, may be integrated to build up a digital model of the environment, including the sides, floor, ceiling, and/or front wall of a truck or other container. Using this information, the control system 140 may cause the mobile base to navigate into a position for unloading or loading.

In additional examples, planar surface information may be extracted from 3D sensors to model walls, floor and/or box faces. After modeling the floor, projection of objects onto the floor plane may enable segmentation of obstacles and/or target objects such as boxes. Floor-plane projection can also be used to model the corrugated sides of a container or truck, which may not be accurately modeled as planes. In further examples, sidewall angles, floor plane roll and pitch, and/or distance from side walls can be used to maneuver a mobile base into a container without collisions. Use of extended 3D information rather than a single line scan may help make the extraction of navigation information robust. For example, the side walls may have a vertical extent that is captured by the 3D sensor. Scanning systems that use a single line of depth information may be slower if they scan vertically and/or less robust because they acquire less information. In additional examples, front plane modeling can determine the distance to a next group of objects to pick in truck unloading.

In further examples, the robotic arm 102 may be equipped with a gripper 104, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

In some embodiments, the gripper could potentially span several boxes or objects and turn on suction for some or all of the covered objects. In some embodiments, the suction or adhesion devices may be a "digital" grid so that the robotic device can turn on any number of the suction devices as will fit boxes sensed for grabbing. In some implementations, the system may notice a seam in the boxes (separation between adjacent boxes) such that suckers can be activated on both sides of the seam to pick up both boxes at once, thereby doubling the throughput. In some embodiments, the suckers can sense after a certain amount time whether they can successfully grip a surface, after which they may automatically shut off. In further embodiments, sections of the suckers can fold down to grasp the top of the boxes. For instance, grippers can initially start at full extension and then conform to the surface being gripped.

In further examples, the robotic arm can implement a wiggle movement to improve a suction grip. In additional embodiments, the robotic arm can wiggle a box side to side to help segment the box from its surroundings. In other embodiments, the arm can wiggle upon pick up of the box to avoid jostling other objects. In such embodiments, when trying to adhere to an object in order to pick it up using suction, the robotic arm may employ a wiggle motion in order to make a firm seal against the object. In a further examples, the robotic arm may wiggle the object as the robotic arm is picking up the object so that the box can more gently break friction or overlap contact with other items. This may help avoid a situation where pulling the object up too directly or too quickly causes other items to be tossed into the air.

According to various embodiments, cardboard boxes can have concave, convex or otherwise rumpled faces that make it hard for a suction device to adhere to. Thus, wiggling the suction device as the device makes suction contact may enable a more reliable grip on cardboard boxes and other non-planar objects. In further examples, when first grabbing a box, a few center suction devices can be turned on and the arm can wiggle back and forth as it starts to pull the box out. This may break surface adhesion with other boxes and help to start to pull the box out. Once the box is at least partially pulled out, the box may then be segmented from the other boxes more easily. In some embodiments, wiggling while picking up an object in clutter may remove other objects from the picked up object, thereby preventing unwanted pick up of surrounding objects.

According to various embodiments, segmentation of items may be necessary for successful grasping. In some embodiments, a smooth surface patch may belong to two separate objects. In such instances, manipulator interaction with the objects may be used to perturb the scene to better segment the objects from each other. For motion separation, the natural or forced movement of objects on a conveyor, on a slide, moving in a tote, and/or actively jostled within a tote may be tracked by optical flow, parallax, or time delayed views to calculate stereo depth in order to enhance object segmentation.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various embodiments, cues such as barcodes, texture coherence, color, 3D surface properties, or printed text on the surface may also be used to identify an object and/or find its pose in order to know where and/or how to place the object (e.g., fitting the object into a fixture receptacle). In some embodiments, shadow or texture differences may be employed to segment objects as well.

Many or all of the functions of robotic device 100 could be controlled by control system 140. Control system 140 may include at least one processor 142 (which could include at least one microprocessor) that executes instructions 144 stored in a non-transitory computer readable medium, such as the memory 146. The control system 140 may also represent a plurality of computing devices that may serve to control individual components or subsystems of the robotic device 100 in a distributed fashion.

In some embodiments, memory 146 may contain instructions 144 (e.g., program logic) executable by the processor 142 to execute various functions of robotic device 100, including those described above in connection with FIGS. 1A-1B. Memory 146 may contain additional instructions as well, including instructions to transmit data to, receive data from, interact with and/or control one or more of the mechanical system 120, the sensor system 130, and/or the control system 140.

Figure 2A:
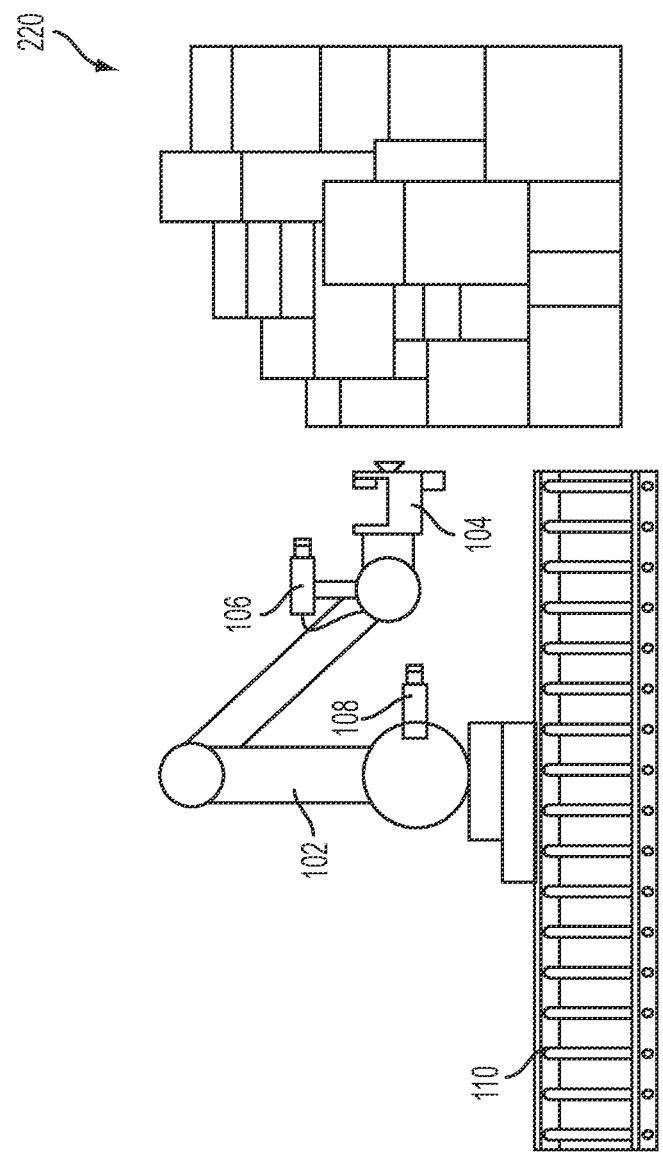
FIG. 2A shows a robotic arm and a stack of boxes, according to an example embodiment.

According to various embodiments, a perception-guided robot is described. For instance, a robotic device may utilize a combination of perception together with planning to guide the robot arm to pick up a box and place it where it needs to go. FIG. 2A illustrates part of the robotic device from FIG. 1A with a stack of boxes, according to an example embodiment. As shown, the robotic device may include a robotic arm 102 with a gripping component 104, sensors 106 and 108, and conveyer 110 as described above. In some examples, the robotic device could be mounted on a holonomic cart as described with respect to FIG. 1A, could be mounted on a different type of movable apparatus, could be mounted on rails or tracks, or could be stationary. The robotic device may be controlled to pick boxes from a stack of boxes 220 containing a heterogeneous mix of shapes and sizes of boxes.

Figure 2B:
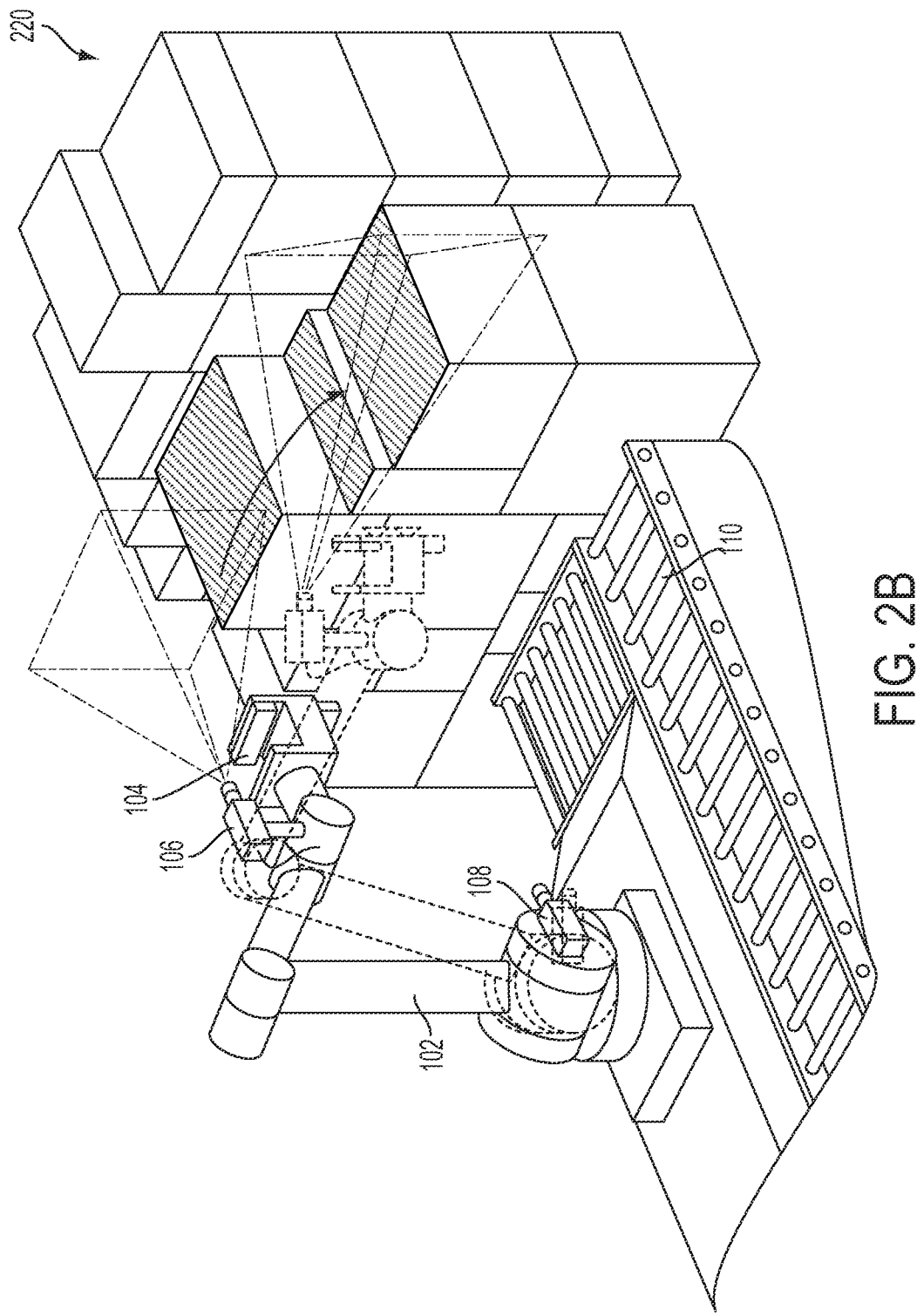
FIG. 2B shows scanning of the stack of boxes from FIG. 2A by a sensor mounted on the robotic arm, according to an example embodiment.

Within examples, a virtual environment including a model of the objects in 2D and/or 3D may be determined and used to develop a plan or strategy for picking up the boxes. In some examples, the robot may use one or more sensors to scan an environment containing objects, as shown in FIG. 2B. As the robotic arm 102 moves, a sensor 106 on the arm may capture sensor data about the stack of boxes 220 in order to determine shapes and/or positions of individual boxes. In additional examples, a larger picture of a 3D environment may be built up by integrating information from individual (e.g., 3D) scans. Sensors performing these scans may be placed in fixed positions, on a robotic arm, and/or in other locations. According to various embodiments, scans may be constructed and used in accordance with any or all of a number of different techniques.

In some examples, scans can be made by moving a robotic arm upon which one or more 3D sensors are mounted. Feedback from the arm position may provide pose information about where the sensor is positioned and may be used to help with the integration. Alternately, or additionally, scans may be made using one or more 2D sensors, for instance by leveraging motion and tracking keypoints in the environment. In further examples, scans may be from fixed-mount cameras that have fields of view (FOVs) covering a given field. In additional examples, scans may be visually registered to help with fine pose estimation, potentially giving better integration results.

In further examples, a virtual environment may be built up using a 3D volumetric or surface model to integrate information (e.g., from different sensors). This may allow the system to operate within a larger environment, such as in cases where one sensor may be insufficient to cover a large environment. Such techniques may also increase the level of detail captured, which may help the robotic device perform various tasks. In particular, integrating information can yield finer detail than from a single scan alone (e.g., by bringing down noise levels). This may make possible better object detection, surface picking, or other applications.

In further examples, wide-angle environment reconstruction may be performed by sensing an environment and extracting that information into a simplified geometric model of simple mathematical 3D geometric forms (e.g., planes, cylinders, cones, hemispheres, etc). In some instances, such techniques may make motion planning easier and/or may make violation of the models (e.g., collisions) easier to detect. Alternately, or additionally, such techniques may allow a parametric description to extend the environment. For instance, the ground may be treated as a plane that extends behind objects that occlude it.

In additional examples, planes or other mathematical surfaces in the environment may be extracted in 3D. These known "ideal" surface detections may be combined into a more accurate model of the environment. For instance, planes may be used to determine the full extents of walls (or mathematical description thereof) and other obstacles to avoid collisions and detect where objects of interest are. Also, mathematical representations of objects may be used to look for anomalies such as when person enters into an environment. Such events may violate the ideal model, which may make their detection easier.

In other examples, certain objects such as boxes may have simple planar form. For instance, a metal can may have a geometric form of a cylinder and a tire may have a geometric form of a torus. Example systems may leverage this trait of certain objects in order model them and/or determine how to motion plan for the objects. For instance, known templates of certain shapes can be used to refine detected features of objects within the environment that appear to match a particular shape.

In some examples, 2D and 3D information may be represented at least in part via one or more facades. A facade may be defined as a near-planar construct containing a set of objects, represented as a depth map (e.g., a 2D map of distances as the third dimension). Examples of facades may include the wall of boxes in a truck, the top of a pallet stack containing boxes or other objects, or the top of a bin of jumbled objects.

Figure 2C:
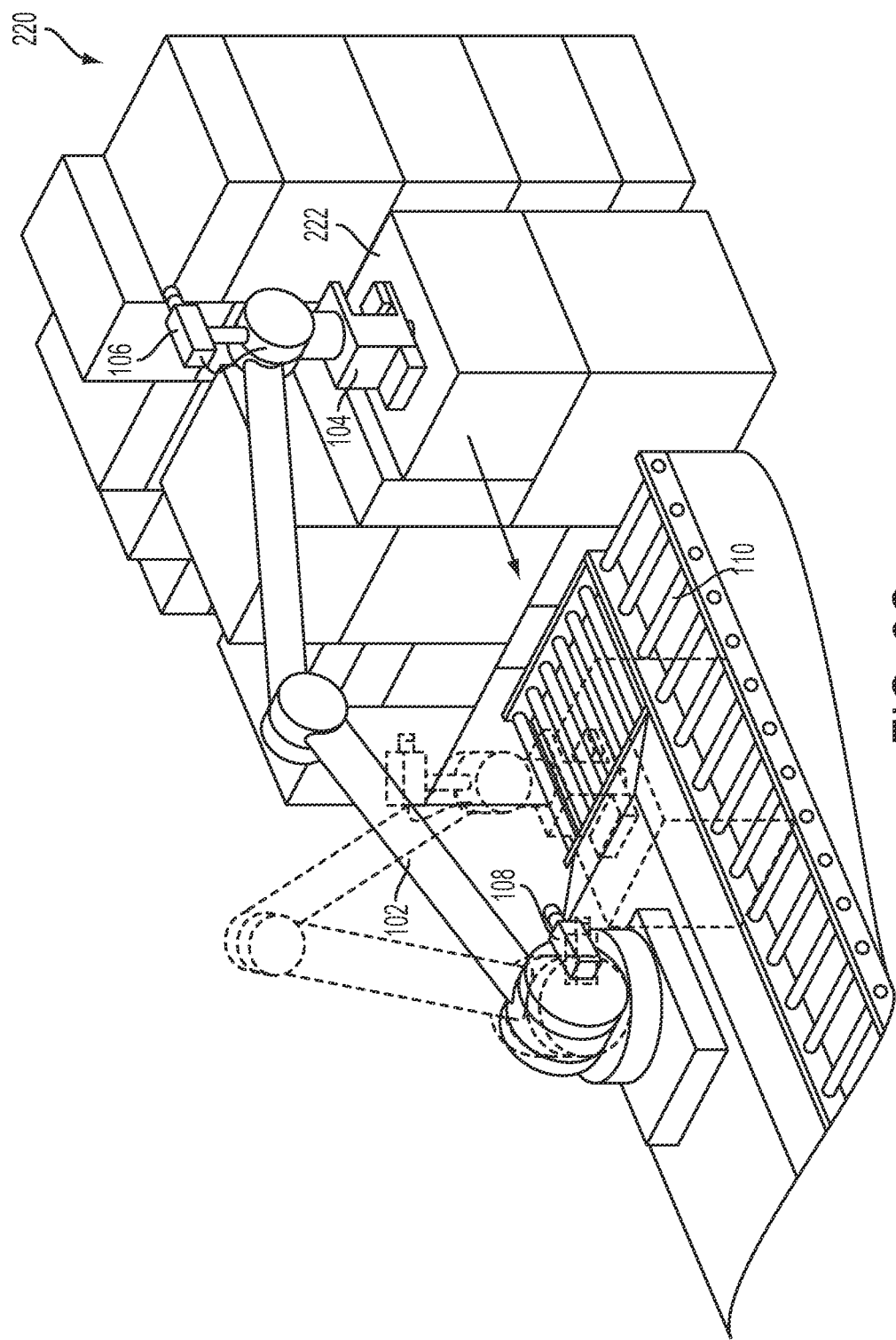
FIG. 2C shows the robotic arm from FIG. 2A moving a box, according to an example embodiment.

In further examples, a facade may be constructed from boxes, for instance to plan in what order the boxes should be picked up. For instance, as shown in FIG. 2C, box 222 may be identified by the robotic device as the next box to pick up. Box 222 may be identified within a facade representing a front wall of the stack of boxes 220 constructed based on sensor data collected by one or more sensors, such as sensor 106 and 108. A control system may then determine that box 222 is the next box to pick, possibly based on its shape and size, its position on top of the stack of boxes 220, and/or based on characteristics of a target container or location for the boxes. The robotic arm 102 may then be controlled to pick up the box 222 using gripper 104 and place the box 222 onto the conveyer belt 110 (e.g., to transport box 222 into a storage area).

In additional examples, a facade may be represented as an orthographic projection of 3D surface information. This representation may allow for parsing the facade to determine interesting areas for a particular application. For example, in truck unloading, the upper left corner of the next box to pick may be determined based on a facade representation. In other examples, an orthographic projection of integrated 3D environment may be determined to give a wide-FOV, easily-parsed representation for performing application-related tasks. One such task may be finding the corner or corners (e.g., top left) of a box to pick. Another such task may involve finding good surfaces (e.g., relatively flat and large) for picking objects out of a bin.

In further examples, a 3D model of a stack of boxes may be constructed and used as a model to help plan and track progress for loading/unloading boxes to/from a stack or pallet. Any one actual camera view of the facade may suffer from point of view occlusions and perspective distortion. Accordingly, multiple RGBD views via robot arm movements and/or different views from a cart base or fixed locations may be combine to create a single facade of the boxes to be picked.

In other examples, the 3D model may be used for collision avoidance. Within examples, planning a collision-free trajectory may involve determining the 3D location of objects and surfaces in the environment. A trajectory optimizer may make use of the 3D information provided by environment reconstruction to optimize paths in the presence of obstacles. In further examples, the optimizer may work in real time and may accept many kinds of constraints. As an example of such a constraint, the optimizer may attempt to keep the end effector level throughout the trajectory.

In additional examples, an environment may be captured as a mesh or set of 3D points. A robot arm may be represented as a convex hull of plane segments for quick collision checking. Constant or frequent updating of the environment may allow the robot arm to quickly respond to changes. In further examples, an optimizer may perform frequent continuous collision checking throughout its path. An optimizer may accept arbitrary constraints in the form of costs, such as to keep a certain distance away from objects or to approach a goal position from a given angle. Additionally, an optimizer may avoid robot fault conditions by working in joint space, keeping track of windup and choosing goal positions from among multiple inverse kinematics solutions. One strategy for motion planning may involve looking ahead several moves to see if the chosen goal joint position will be acceptable for the next move.

In some embodiments, path constraints, such as collision avoidance for robotic arms, cameras, cables, and/or other components, may be put in a constraint based planning solver and solved for to yield as best path to move the arm for perception. Additionally, in some embodiments, the solver may determine a best path for picking up, moving, and placing an object.

According to various embodiments, 3D and/or visual sensors may be calibrated to determine their pose with respect to the workspace. In the case of fixed sensors, the calibration may determine their fixed pose in the workspace. In the case of a sensor on the arm, calibration may determine the offset pose of the sensor from the arm link to which it is attached.

Within examples, calibration techniques may allow for the calibration of an arbitrary number of sensors in the workspace. Calibration may involve determining some or all of a variety of parameters and coefficients. For example, calibration may solve for one or more intrinsic parameters such as focal length and image center. As another example, calibration may determine one or more distortion coefficients such as models of radial and tangential distortion. As yet another example, calibration may solve for one or more extrinsic parameters, where the object is in a scene relative to a pattern or other sensors that identified the same pattern in a scene.

In some examples, calibration may be performed at least in part by using a calibration pattern, which may be a known set of features in 2D or 3D. For instance, a known pattern of dots may be used, where the distance between each dot and the other dots is known. Calibration may be performed at least in part by collecting multiple different views of an object. In further examples, capturing multiple views of a calibration pattern in different positions may allow for (1) calibration of the one or more coefficients of the camera and/or (2) knowledge of where the camera is relative to the coordinate system established by where the calibration pattern was fixed. In particular embodiments, a camera in the scene may identify a calibration pattern on the robot arm while a camera on the arm identifies a calibration pattern in the scene simultaneously.

In additional examples, calibration may involve a camera fixed in a scene. In this case, a calibration pattern may be placed on a robotic arm. The robotic arm may be configured to move through the scene as multiple views of the calibration pattern on the robotic arm are collected. This may help to calibrate the camera and/or be useful for relating the coordinate system of the camera to that of the robot. Further, the relation of each device to the other can be determined by each device as the robotic arm moves.

In certain examples, calibration may involve a camera located on a robotic arm. A calibration pattern may be mounted on a wall or table. Then, the camera may be moved around, collecting multiple views of the calibration pattern from different robot or robotic arm positions. When different 3D or 2D views (e.g., 2, 20, 200) are collected, these views can be used to solve for the calibration relationships. After calibration, when the camera on the arm moves, the system can determine where it is relative to the coordinate system set based on the location of the calibration pattern in the scene. In particular embodiments, both the calibration pattern and the camera may be movable. For example, the calibration pattern may be located on a conveyor belt where the robotic arm may be configured to place boxes. After calibration, the system may determine where the camera was relative to that spot on the conveyor belt.

In further examples, nonlinear optimization may be performed in a two-stage process for robust estimation of 3D sensor calibration. In one stage, an initialization may be derived from the relative pose offsets of the target and the sensors. In another stage, given the initialization, a batch bundle adjustment may be used to find the optimal pose of the cameras together with the target points. Calibration can be extended to the estimation of robot parameters such as joint lengths and joint angle offsets.

In other examples, known, precise, robot motion of the camera over a calibration pattern, or a calibration pattern over a camera may be used to improve calibration results. For instance, information about precisely how the camera moves may be used to obtain more accurate camera calibration. That is, if the camera is moved 50 mm right, the corresponding (perspective projection) amount of movement from the calibration object may be detected. This information may be used to jointly or separately optimize the calibration and tracking parameters.

In additional examples, a robot can look at its ongoing calibration and move in such a way as to maximize information for better calibration. For example, it can detect that some view areas have not been seen and go to those views.

In further examples, a system for the practical manipulation of heterogeneous, categorical items, generally from a cluttered collection area to a defined bin, is presented. In some embodiments, the pick location containing the items may not be sensitive to precise object orientation(s) and items may be mixed together. In additional examples, the place location for the items may or may not be sensitive to object orientation. In some examples, the pick-and-place regions may be defined as 3D regions acceptable for picking or placing an object, with some tolerance. The pick-and-place region may be highly cluttered with similar and/or disparate objects. In other embodiments, the items may come from or be put into a fixture, such as metal or plastic snaps that hold the sorted item in a particular orientation.

In additional examples, environment modeling of both the pick-and-place location may be used for intelligent grasp location and motion, as well as event reporting (e.g., when a place region is full or a pick region is empty). In some examples, object bounding volumes may be computed and/or distinguishing features of objects may be found (such as textures, colors, barcodes or OCR). In some embodiments, objects may be sorted into an assigned destination location by matching against a database of location assignments indexed by object type or object ID. For instance, an object's locations may be derived from reading a barcode, considering the size of the object, and/or by recognizing a particular kind of object.

In some examples, a plan for a robotic device may be determined in order to achieve certain configurations of the objects within a target location for the objects. For instance, the goals for loading/unloading or constructing/deconstructing pallets may be to achieve: 1) a dense packing with minimal air gaps in between boxes, and/or 2) a stable packing that won't easily collapse. In some embodiments, stability may require that, in general, heavy objects are on the bottom, and light objects are on top. In other examples, pallets may be created in order to avoid non-interlaced column stacks, column leans, or other characteristics of a bad stack.

In further examples, the pallet or truck/container may be loaded such that work by human operators in subsequent unloading processes is minimized. For instance, in some embodiments, items may be placed in last in, first out order such that, upon unpacking, the items needed first are on top, the items needed second are one layer down and so on. In other examples, the loading of pallets may be independent of how items flow towards the packing cells. Thus, according to some embodiments, the system can handle packages sent in random order or in an order known in advance. In addition, in some embodiments, systems may adapt to changes in the flow of items on the fly. In further examples, one or more boxes may be recorded and buffered by holding the boxes in a temporary storage area where their order can be changed along the way.

According to various embodiments, a 2D simulator and/or a 3D simulator may be utilized for truck or container loading/unloading or for pallet loading/unloading. In some examples, the state of a stack of boxes may be captured in the physical world and input into the simulator. In some embodiments, a variable size queue of boxes from one to all the boxes may be used by a simulator for finding a next box to pick. For example, a queue of 2 boxes or 4 boxes or 10 boxes may be considered by a simulator.

In further examples, the simulator may search over the boxes in the queue to find the best box placement by heuristic algorithms and/or by brute force or multi-resolution search. In some embodiments, the system may increment with increasingly fine placement of boxes around the best sites found in the previously coarser level. In some embodiments, once placement of particular next box has been determined, a physics planner may be used for motion planning in order to move the box efficiently to the determined locations. In further examples, the physical and simulated stacks may be continuously monitored for quality of the stack (e.g., density, stability, and/or order placement). In some examples, the process may be repeated until all the boxes have been placed or the target container can no longer fit in another box.

Figure 3:
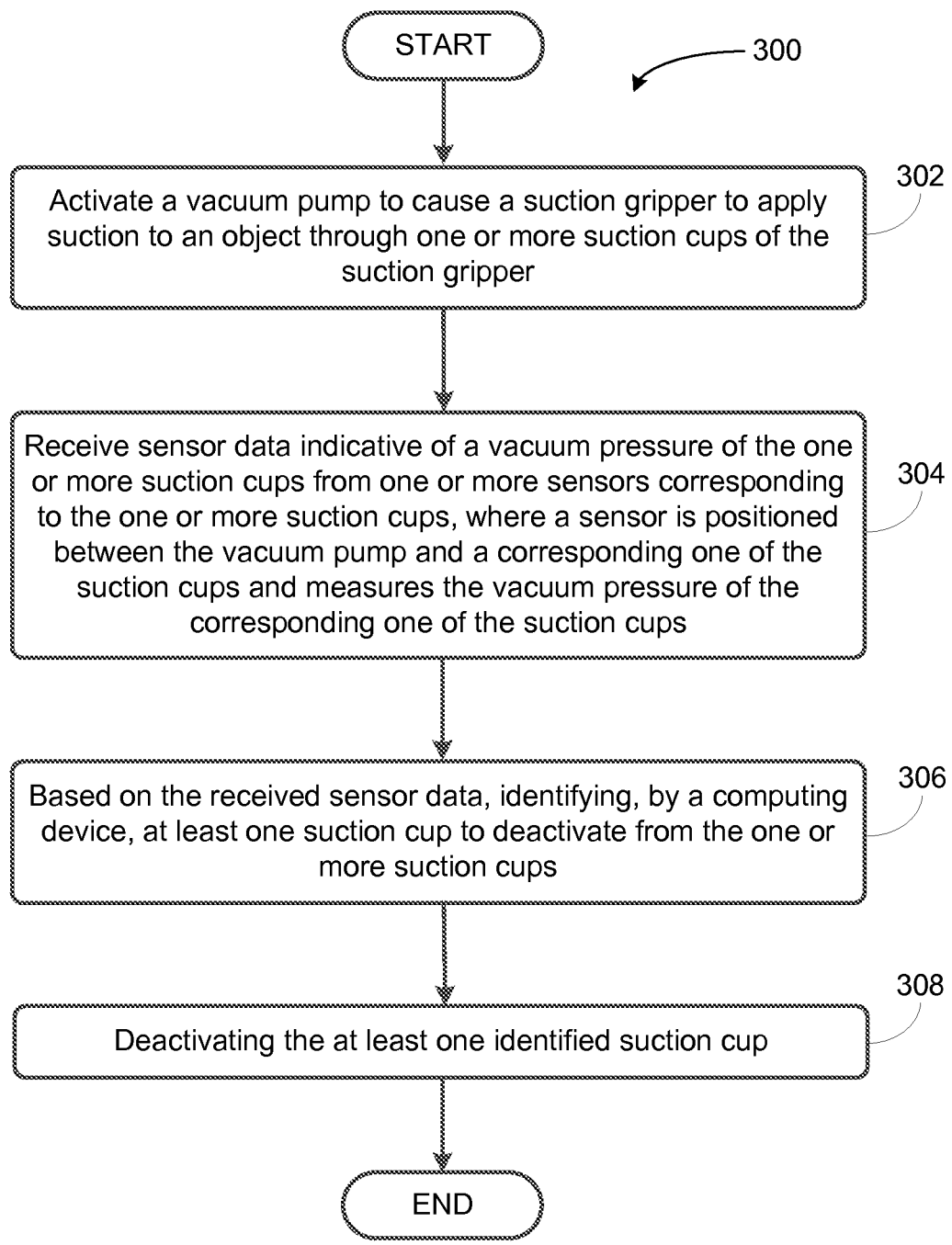
FIG. 3 is a block diagram of a method, according to an example embodiment.

FIG. 3 illustrates a flowchart showing a method 300 that may allow for control of a suction gripper with multiple suction cups, according to an example embodiment. Method 300 may be carried out using any robotic device that may be equipped with a suction gripper, such as a device including a robotic arm mounted on a moveable cart, as illustrated and described with respect to FIGS. 1A-1B. In other examples, method 300 may be carried out using a robotic manipulator mounted on a different type of movable apparatus, on a rail or track, or at a stationary location. In further examples, part or all of method 300 may be performed by one or more control systems located within a suction gripper, on a robotic device, and/or in remote communication with a robotic device. Additionally, while examples with an end-effector-mounted suction gripper on a single robotic arm may be described, various alternative embodiments may include other types of robotic manipulators, or may include other automated systems integrated with a robotic manipulator.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 3. Where used, program code can be stored on any type of computer-readable medium, for example, such as a storage device including a disk or hard drive.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

As shown by block 302 of FIG. 3, method 300 may initially involve activating a vacuum pump to cause a suction gripper to apply suction to an object through one or more suction cups. More specifically, a suction gripper may be equipped with a certain number of suction cups (e.g., 4 or 9 or 16) that each can attach to a surface of an object. A control system may "activate" one or more of the suction cups by causing the vacuum pump to apply suction through the active suction cups (e.g., to grip an object). In some examples, one or more suction cups may also be deactivated such that the vacuum pump does not apply suction through the deactivated suctions cups. For instance, a valve corresponding to each deactivated suction cup may be closed to separate the vacuum pump from the deactivated suction cups.

Within examples, the suction gripper may be attached to a robotic manipulator (e.g., a robotic arm) that uses the suction gripper to pick up and/or move objects. In further examples, a control system of the robotic manipulator and/or the suction gripper may initially position the suction gripper so that some or all of the gripper's suction cups are adjacent to an object and may be activated to grip the object. In additional examples, the robotic manipulator may be equipped with one or more optical sensors (e.g., depth and/or visual sensors) capable of detecting the shape and/or size of an object. The control system may use data from the optical sensors to position the gripper and/or determine which suction cups of the gripper to initially activate.

In some examples, all of the suction cups may be positioned in contact with a surface of an object and initially activated to grip the object. For instance, the suction gripper may contain 16 suction cups and all 16 suction cups may be activated to pick up certain types of objects. In additional examples, the suction cups may be oriented to affix to different surfaces of the object. For instance, in one example, eight of the suction cups may be oriented to affix to a top surface of a box and another eight of the suction cups may affix to a front surface of the box. In further examples, a suction gripper may include groups of suction cups on multiple surfaces of the gripper with different orientations to grip multiple faces of an object.

In additional examples, only a certain portion of the suction cups of a suction gripper may initially be activated to grip an object. For instance, the suction gripper may contain 16 suction cups, but only 10 of the suction cups may be positioned to affix to particular object in order to grip the object. In further examples, certain subgroups of suction cups may be activated in order to pick an object depending on which surfaces of the object may be gripped. For instance, the system may perform a "top pick" to grip a box using only the top surface of the box, and only the suction cups used to apply suction to the top surface of the box for the top pick may be activated.

In additional examples, a perception control system may leverage optical sensor data and/or other types of data to determine how to position the gripper and/or which suction cups to activate to pick a particular object. In further examples, three-dimensional visual data may be used to determine an estimate of surface quality of object surfaces with respect to suction cup performance. The estimate of surface quality may be used to initialize the state of the suction cups, including placement and/or vacuum flow, before the grasp starts. In some examples, this initialization may enable a control algorithm based on vacuum sensor feedback to converge more quickly.

In additional examples, a surface quality metric may be based on the curvature of the surface (e.g., how close to planar the surface is), the continuity of the surface (e.g., whether the surface has holes or other deformations), and/or the texture of the surface (e.g., whether the surface is rough or smooth). In further examples, the surface quality metric may also be based on area (e.g., whether the suction cup will cover the entire region or a certain portion of the region). Other factors indicative of suction cup performance on a particular surface may be used to determine the surface quality of metric as well or instead.

In some example, the surface quality metric may be used as part of a grasp search algorithm to find a good grasp placement. In other examples, the surface quality metric may also be used to estimate probable gripper forces that the gripper might exert. In some cases, this estimation may be used by a control algorithm to abort a grasp or choose a more conservative trajectory to move an object. In further examples, the surface quality metric and corresponding estimates of probable gripper forces may be used as a prior to a vacuum suction cup control algorithm.

Figure 4A:
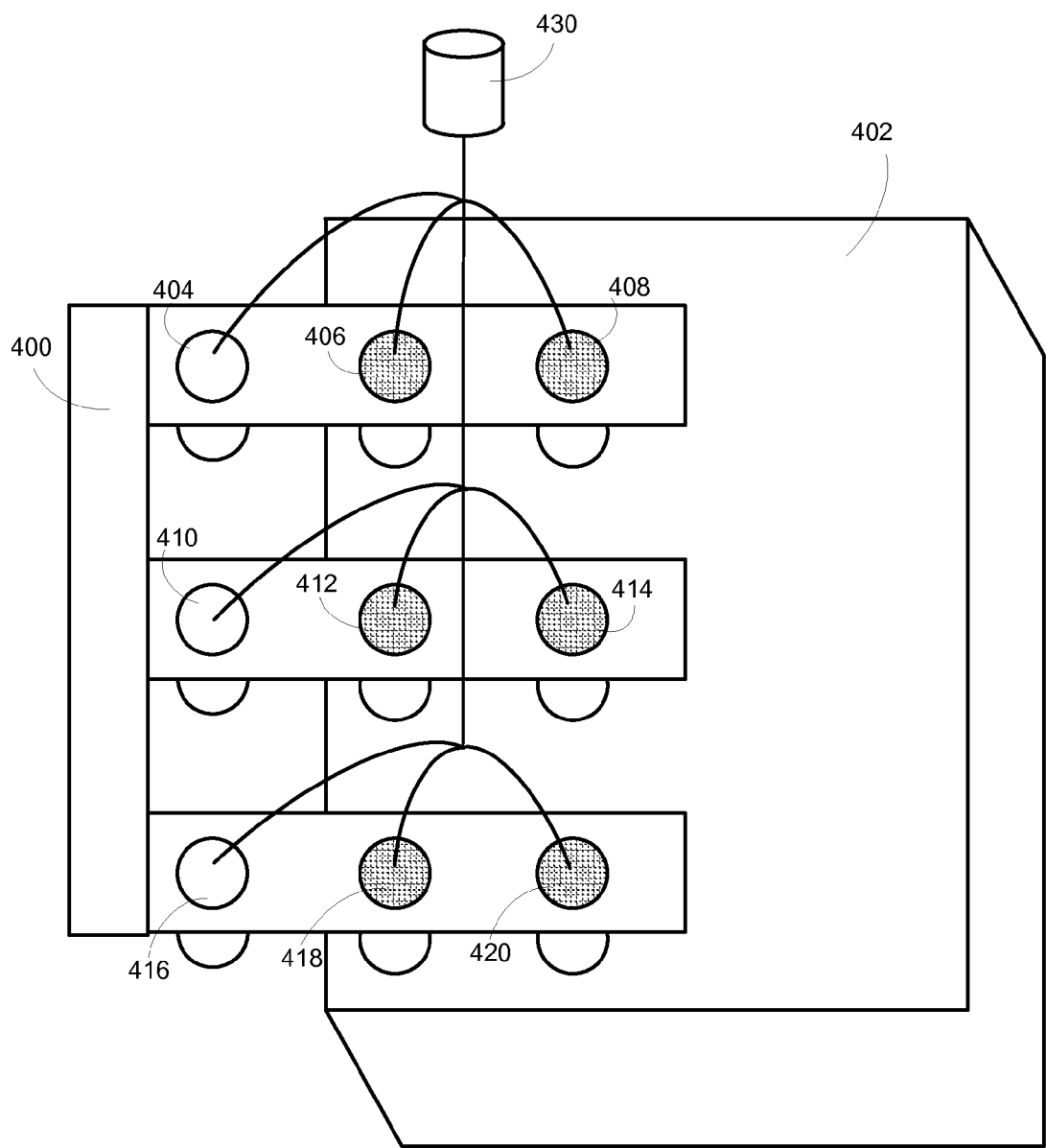
FIG. 4A illustrates a gripper with multiple suction cups, according to an example embodiment.

FIG. 4A illustrates a suction gripper with multiple suction cups, according to an example embodiment. More specifically, a suction gripper 400 may include a number of suction cups 404-420 to grip objects such as box 402. The suction gripper 400 may additionally include a vacuum pump 430 that is capable of applying suction through any or all of suction cups 404-420 in order to apply suction to an object. In some examples, the suction gripper 400 may be mounted to an end effector or otherwise coupled to a robotic manipulator to move objects that have been gripped by the gripper. In FIG. 4A, the suction gripper 400 is shown with 9 suction cups, but a different number of suction cups may be used. Additionally, components of a suction gripper such as the vacuum pump or suction cups could be configured in different ways and/or located in different positions than specifically illustrated here as well.

In further examples, one or more of the suction cups 404-420 of suction gripper 400 may be activated to grip an object. For instance, a control system may first activate particular suction cups by opening valves that separate the suction cups from the vacuum pump, and then it may activate the vacuum pump to apply suction through the open suction cups. In some examples, only a certain portion of the suction cups 404-420 may be activated to grip a particular object. For instance, as shown by the shaded circles in FIG. 4A, six of the suction cups 406, 408, 412 414, 418, and 420 positioned adjacent to a surface of box 402 may be activated in order to cause the suction gripper 400 to grip box 402. Additionally, the other suction cups 404, 410, and 416 of suction gripper 400 may be deactivated while picking box 402, as shown by the open circles in FIG. 4A. Accordingly, the suction gripper 430 may initially only apply suction through active suction cups 406, 408, 412, 414, 418, and 420 while gripping box 402. In further examples, a control system of gripper 400 may use optical sensor data to determine how to position the gripper 400 and/or which suction cups to initially activate to grip box 402.

Referring back to FIG. 3, method 300 may further involve receiving sensor data indicative of a vacuum pressure of the one or more active suction cups from one or more sensors, as shown by block 304. More specifically, one or more digital or analog sensors may be positioned in line between the suction cups and the vacuum pump to measure vacuum pressures of individual suction cups. The sensor data may be received after the suction gripper has activated the suction cups to apply suction to an object in order to measure utilization of individual suction cups while gripping the object.

In some examples, the sensors may measure the vacuum response level of individual suction cups (e.g., a vacuum response level between 0 and 30 inches of mercury). In other examples, the sensors may report sensor data in other ways as well or instead. For instance, the sensors may only report whether or not the vacuum pressure of a particular suction is above a threshold level (e.g., above 10 inches of mercury). In further examples, the sensors may report sensor data at a particular point in time after gripping the object, at particular time intervals, and/or continuously.

Figure 4B:
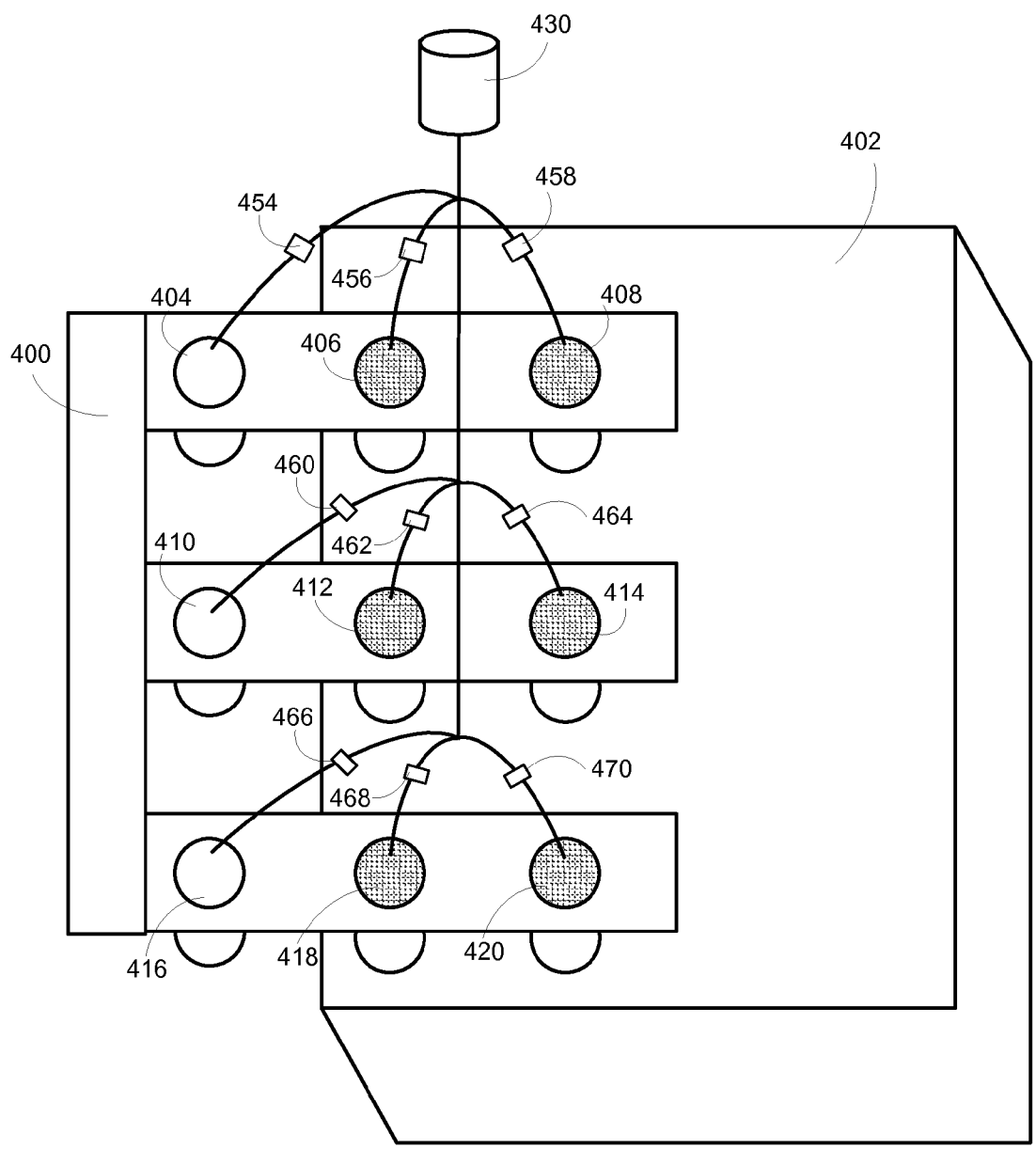
FIG. 4B illustrates a gripper with multiple suction cups and corresponding sensors, according to an example embodiment.

FIG. 4B illustrates a suction gripper with multiple suction cups and corresponding sensors, accordingly to an example embodiment. More specifically, suction gripper 400 may include digital or analog sensors 454-470 corresponding to suction cups 404-420. The sensors 454-470 may be positioned between the vacuum pump 430 and the suction cups 404-420 in order to measure the vacuum pressures of suction cups 404-420.

In some examples, each of the sensors 454-470 may correspond to a particular one of the suction cups 404-420 to measure the vacuum response of the particular corresponding suction cup. For instance, sensor 456 may correspond to suction cup 406 to measure the vacuum pressure of suction cup 406 when suction cup 406 is activated, sensor 462 may correspond to suction cup 412 to measure the vacuum pressure of suction cup 412 when suction cup 412 is activated, and so on. In further examples, sensor data may only be received from sensors corresponding to active suction cups. For instance, referring to FIG. 4B, sensor data may only be received from sensors 456, 458, 462, 464, 468, and 470 corresponding to the six active suction cups 406, 408, 412, 414, 418, and 420 used by suction gripper 400 to grip box 402.

In some examples, one sensor may correspond to each suction cup to measure the vacuum pressure of the corresponding suction cup as shown in FIG. 4B. In other examples, sensors may only be included to measure the vacuum pressure of certain suction cups from the suction gripper. For instance, a sensor may be included for one suction cup from each of several subgroups of suction cups, where different subgroups may be used to grip different surfaces and/or different sections of objects. In such an example, the sensor data received for one suction cup may be used to control the entire subgroup (e.g., to turn off or on the all the suction cups in the subgroup). In another example, a sensor may instead measure the vacuum response of entire subgroups of suction cups rather than individual suction cups (e.g., by routing multiple cups past a single sensor). In further examples, different types or configurations of sensors may be used together within a single suction gripper as well.

Referring back to FIG. 3, method 300 may further involve identifying at least one suction cup to deactivate from the one or more active suction cups, as shown by block 306. More specifically, a control system may use the sensor data received from the in-line sensors indicating vacuum pressures of individual suction cups to identify one or more suction cups to deactivate in an effort to improve performance of the suction gripper.

In some examples, the control system may deactivate a certain number of suction cups with the worst performance from the group of active suction cups. For instance, the control system may deactivate the two or three suction cups with the lowest vacuum pressures out of ten active suction cups. By deactivating one or more suction cups, the vacuum pump may apply greater suction force through the remaining active suction cups.

In further examples, the control system may deactivate suction cups with a vacuum response below a certain threshold level. For instance, the threshold level may be set to eight inches of mercury, and any suction cup with a sensor reading below eight inches of mercury may be deactivated. In additional examples, the threshold level may be varied depending on factors such as the size or type of object to be gripped, the number of active suction cups, and/or past performance of the gripper using different threshold levels.

In yet further examples, the control system may deactivate suction cups in an effort to maximize the overall gripping force of the suction gripper. For instance, the control system may use the vacuum responses of individual suction cups to predict the gripping force of the suction gripper for different combinations of active suction cups. In further examples, the control system may solve an optimization problem to identify a set of suction cups that maximizes overall gripping force. In other examples, one or more heuristics may also be used to identify suction cups to deactivate. In further examples, these heuristics may be learned using one or more machine learning algorithms. For instance, it may be determined that if one or more suction cups gripping a particular surface or section of an object have poor vacuum response, one or more other suction cups gripping the same surface or section of the object should also be deactivated.

In additional examples, a control system may employ real-time switching to activate and/or deactivate one or more suction cups at one or more points in time. For instance, after deactivating one or more suction cups, the control system may receive additional sensor data indicative of the vacuum pressures of one or more suction cups that are still active. The control system may then reevaluate which suction cups to use to grip the object. In some cases, the control system may deactivate one or more additional suction cups and/or reactivate one or more deactivated suction cups to further fine tune the performance of the gripper. In further examples, the set of active suction cups may be periodically modified by the control system over time (e.g., as a robotic arm moves an object while gripping the object with the gripper).

Figure 4C:
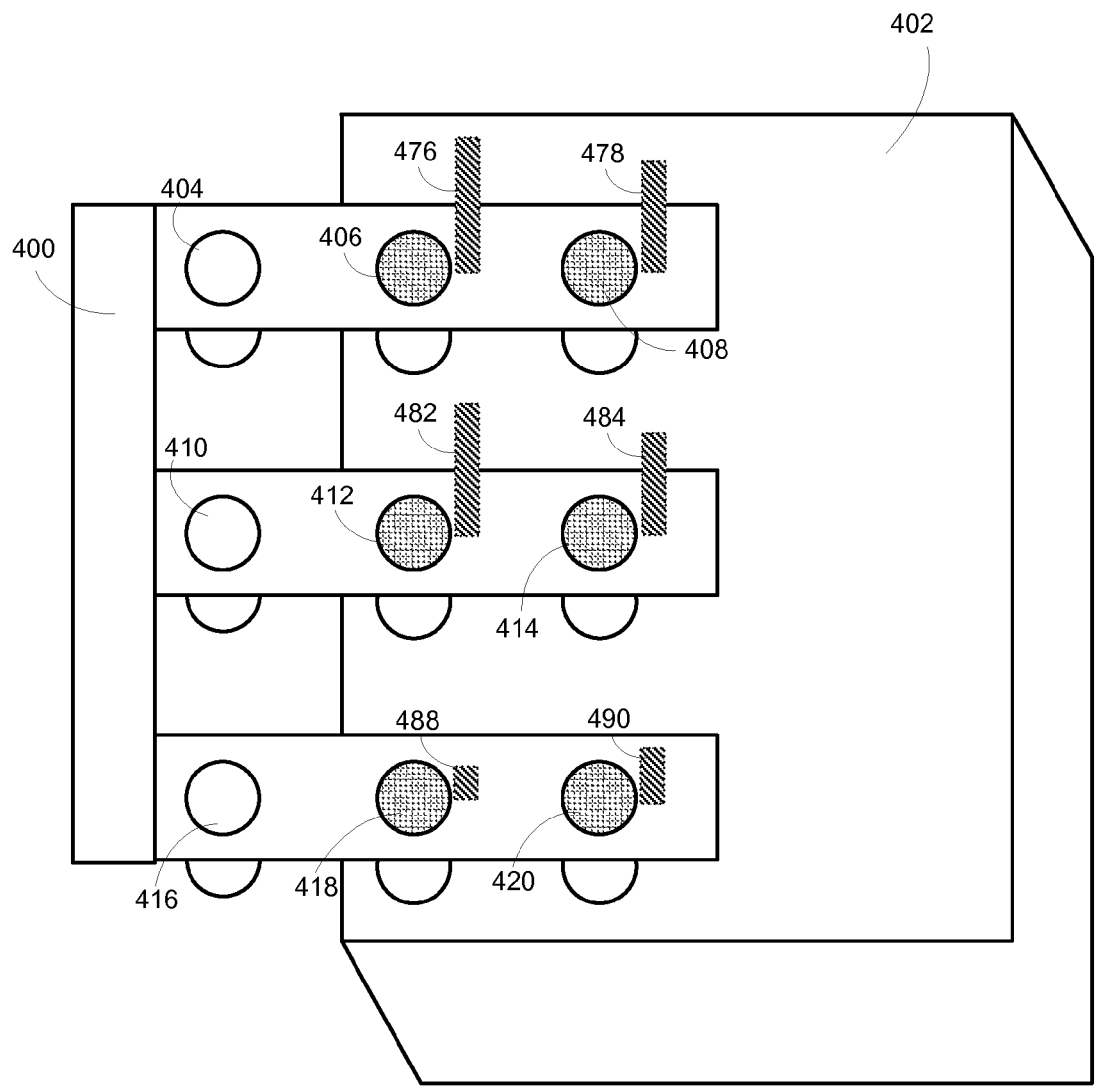
FIG. 4C illustrates example sensor data from the sensors from FIG. 4B, according to an example embodiment.

FIG. 4C illustrates sensor data that may be used by a control system to identify one or more suction cups to deactivate, according to an example embodiment. More specifically, the sensor data received from the in-line sensors may indicate the current vacuum pressure levels of active suction cups 406, 408, 412, 414, 418, and 420. The vacuum pressures levels are depicted in FIG. 4C as bars 476, 478, 482, 484, 488, and 490, which may represent different levels of vacuum response of each of the corresponding suction cups 406, 408, 412, 414, 418, and 420. For instance, bar 476 may be higher than bar 488, indicating that suction cup 406 has a stronger vacuum response than suction cup 418. In some examples, the vacuum response may be measured from 0 to 30 inches of mercury, where 30 is full-scale vacuum.

In further examples, the control system of suction gripper 400 may identify one or more of the active suction cups 406, 408, 412, 414, 418, and 420 to deactivate based on the sensor data depicted by bars 476, 478, 482, 484, 488, and 490. For instance, in one example, the control system may deactivate the two suction cups with lowest vacuum pressures from the group of active suction cups. Therefore, the control system may deactivate suction cup 418 and suction cup 420. In other examples, different methods of identifying suction cups to deactivate may be used instead or as well. For instance, suction cups 418 and 420 may be identified to be deactivated because their corresponding vacuum pressure levels illustrated by bars 488 and 490 may be below a threshold level of vacuum. In another example, a solution to an optimization problem may indicate that the overall gripping force of suction gripper 400 may be improved by deactivating suction cups 418 and 420. In further examples, one or more different suction cups from the group of active suction cups may be deactivated as well or instead.

Referring back to FIG. 3, method 300 may further involve deactivating the one or more identified suction cups, as shown by block 308. After identifying the suction cups to be deactivated, a control system may deactivate the suction cups in an effort to improve overall gripper performance. In some examples, the control system may deactivate one or more suction cups by preventing the vacuum pump from applying suction through the deactivated suction cups. For instance, they gripper may include operable and closeable valves corresponding to the suction cups that separate the suction cups from the vacuum pump. In order to deactivate a particular suction cup, the control system may then cause the corresponding valve to be closed. In further examples, other mechanisms to prevent the vacuum pump from applying suction through deactivated suction cups may be used instead of or in addition to valves as well.

Figure 4D:
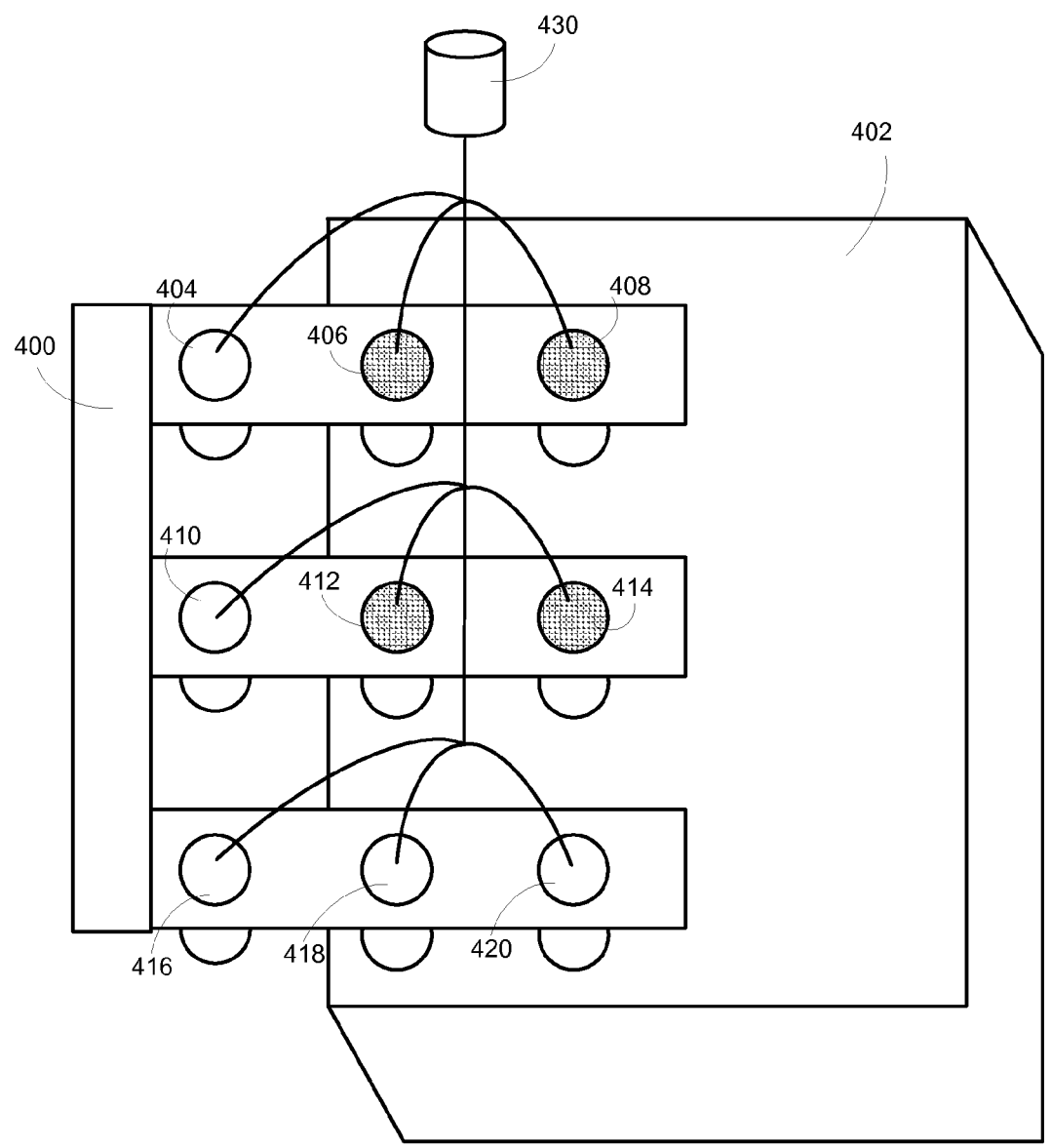
FIG. 4D illustrates the gripper from FIG. 4A with different active suction cups, according to an example embodiment.

FIG. 4D illustrates a suction cup with multiple suction cups after one or more of the suction cups have been deactivated, according to an example embodiment. More specifically, a control system may deactivate two of the suction cups 418 and 420 of suction gripper 400 by preventing vacuum pump 430 from apply suction to box 402 through suction cups 418 and 420. In some examples, valves corresponding to suction cups 418 and 420 may be closed in order to separate vacuum pump 430 from suction cups 418 and 420 to deactivate the suction cups. In additional examples, the vacuum pressure applied by vacuum pump 430 through remaining active suction cups 406, 408, 412, and 414 may be increased by deactivating suction cups 418 and 420. In further examples, the overall gripping force of suction gripper 400 may also be increased by deactivating suction cups 418 and 420.

In additional examples, the control system may receive additional sensor data indicative of the vacuum pressures of remaining active suction cups 406, 408, 412, and 414 after suction cups 418 and 420 have been deactivated. In further examples, the control system may then deactivate one or more additional suction cups from active suction cups 406, 408, 412, and 414 and/or reactive one or both of the deactivated suction cups 418 and 420 to further refine overall system performance. For instance, deactivating suction cups 418 and 420 may result in an unexpected drop in performance of one or more of the remaining active suction cups, which may instigate further modifications of the set of active suction cups used to grip box 402. In another example, different suction cups may be deactivated and/or reactivated depending on where the box is within a trajectory used to move the box.

In further examples, a suction gripper, such as suction gripper 400 from FIGS. 4A-4D, may be mounted on or otherwise coupled to a robotic manipulator (e.g., a robotic arm) to move objects with the suction gripper. For instance, the robotic manipulator may be controlled to load or unload boxes or other objects to or from a pallet or facade as previously discussed. In some examples, the robotic manipulator may first position the suction gripper so that one or more suction cups are adjacent to object. The adjacent suction cups may then be initially activated to grip the object. In further examples, example methods such as method 300 of FIG. 3 may then be used to refine the set of suction cups used to grip the object before and/or during movement of the object by the robotic manipulator.

In additional examples, a trajectory may be determined for the robotic manipulator to move the gripped object without causing the gripper to drop the object. More specifically, a particular optimization of the suction gripper resulting in a certain subset of active suction cups may produce a certain amount of gripping force on the object. In some examples, this total gripping force may be estimated using the sensor data from the in-line sensors indicative of the vacuum pressures of individual suction cups. The total gripping force may indicate a current maximum gripping capability of the gripper that may be used to determine a trajectory that won't cause the gripper to drop the object. For instance, the velocity or acceleration of the object may be controlled to avoid reaching a level that might cause the gripper to drop the object, given the current gripping force on the object.

In further examples, the robotic manipulator may also be equipped with a force-torque sensor to measure forces on the gripper (e.g., forces resulting from moving an object with the gripper). In some examples, sensor data from the force-torque sensor may also be used by a control system to determine a trajectory for the robotic manipulator to move the object. For instance, the control system may consider both the gripping force of the suction gripper on the object and the forces experienced by the gripper itself as the object is moved to determine a trajectory does not cause the gripper to drop the object. In further examples, the control system may periodically modify the trajectory based on the received sensor data from the force-torque sensor to safely move the object without dropping it. In yet further examples, sensor data from the force-torque sensor may also be used by the control system to influence when and/or which suction cups to deactivate and/or activate as well.

In additional examples, the robotic manipulator may be controlled to move different objects with the suction gripper over time. In some examples, sensor data from the in-line sensors may be used by the control system to flag one or more suction cups of the suction gripper for replacement. For instance, a particular suction cup may be identified that consistently underperforms compared to other suction cups used by the suction gripper. In such an example, the underperforming suction cup may be identified and replaced with a replacement suction cup.

In another example embodiment, a control system may cycle through individual suction cups and/or groups of suction cups in succession to test fix leaking suction cups. For instance, a control algorithm may initially involve positioning the gripper over an object to be picked up with all the suction cups in an off state. Then, each suction cup may be turned on in a serial sequence to see if the suction cup is leaking. For instance, a control system may activate each suction cup in sequence, wait for equilibrium to determine if the suction cup is leaking, and then deactivate the suction cup if it is leaking.

In further examples, such a control algorithm that tests suction cups in succession may be used together with one or more other control strategies described herein. In other examples, the control algorithm may be used as a fallback approach if a more aggressive strategy fails to identify faulty suction cups and/or achieve a good grip on an object. In further examples, testing suction cups in succession may allow for use of less sensitive sensors within the gripper, particularly in cases where loss of suction on one or several suction cups causes pressure to rise on all suction cups because the pump cannot keep up with the flow.

In additional examples, a control algorithm may test groups of two or more suction cups in succession. In some examples, the number of suction cups that can be tested in parallel may be computed assuming a worst predicted flow rate. Allowing the control system to activate multiple unmeasured suction cups at a time may allow for faster completion of the testing process. In particular, the wait for equilibrium may be amortized over each group of suction cups to be tested. In other examples, prior knowledge predicting performance of each suction cup may be available, which may also be used to speed up convergence.

In further examples, gripping strategies used by the robotic manipulator and/or the suction gripper may be refined over time using the sensor data from the in-line sensors. For instance, sensor data indicating utilization of different suction cups to grip objects may be used to determine how to position the gripper and/or which suction cups to initially activate to grip objects in the future. In further examples, how to refine the set of active suction cups (e.g., which suction cups to activate and/or deactivate) may also be determined using past suction cup performance data. In additional examples, a control system may apply a machine-learning process to improve future control decisions for the suction gripper. For instance, the control system may apply any or all of a number of different possible machine learning processes, including an artificial neural network, support vector machines, genetic algorithms, Bayesian inference, Bayes nets, a reinforcement learning method, regression analysis, and/or decision trees.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information, such as a block of method 300 described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system, comprising:
a suction gripper, comprising:
a vacuum pump;
a plurality of suction cups coupled to the vacuum pump;
a plurality of valves corresponding to the suction cups; and
a plurality of sensors corresponding to the suction cups, wherein a sensor is positioned between the vacuum pump and a corresponding one of the suction cups and measures a vacuum pressure of the corresponding one of the suction cups; and
a control system comprising a non-transitory computer-readable medium having stored therein instructions, that when executed by the control system, cause the control system to perform functions comprising:
opening at least two of the valves corresponding to at least two suction cups from the plurality of suction cups;
activating the vacuum pump to cause the suction gripper to apply suction to an object through the least two suction cups from the plurality of suction cups;
while the at least two valves corresponding to the at least two suction cups are open, receiving sensor data indicative of respective vacuum pressures of the at least two suction cups from the corresponding sensors;
based on the received sensor data, comparing the respective vacuum pressures of the at least two suction cups with one another to identify at least one suction cup from the at least two suction cups with at least one lowest respective vacuum pressure among the at least two suction cups; and
closing at least one of the open valves that corresponds to the at least one identified suction cup.

2. The system of claim 1, the functions further comprising:
using the respective vacuum pressures of the at least two suction cups to predict an amount of gripping force that will be applied by the suction gripper to the object when the suction gripper has a plurality of different combinations of open valves; and
identifying the at least one suction cup to maximize the predicted amount of gripping force applied by the suction gripper to the object.

3. The system of claim 1, the functions further comprising:
after closing the at least one valve, receiving additional sensor data indicative of updated respective vacuum pressures of one or more suction cups with open corresponding valves from the corresponding sensors;
based on the additional sensor data, identifying at least one additional suction cup to deactivate from the one or more suction cups; and
closing at least one additional valve corresponding to the at least one identified additional suction cup to deactivate the at least one identified additional suction cup.

4. The system of claim 3, wherein identifying at least one additional suction cup to deactivate from the one or more suction cups comprises determining that at least one vacuum pressure of the at least one additional suction cup dropped after closing the at least one valve.

5. The system of claim 1, the functions further comprising:
after closing the at least one valve, receiving additional sensor data indicative of updated respective vacuum pressures of one or more suction cups with open corresponding valves from the corresponding sensors;
based on the additional sensor data, identifying at least one closed valve to reopen; and
reopening the at least one identified closed valve.

6. The system of claim 1, the functions further comprising using the received sensor data to identify one or more suction cups for replacement.

7. The system of claim 1, the functions further comprising:
sequentially opening each valve of the suction gripper;
activating the vacuum pump to cause the suction gripper to apply suction to the object through each suction cup when the corresponding valve is open;
identifying at least one leaking suction cup that has a drop in vacuum pressure when the at least one valve corresponding to the at least one leaking suction cup is open; and
closing the at least one valve corresponding to the at least one leaking suction cup.

8. The system of claim 7, wherein sequentially opening each valve of the suction gripper comprises sequentially opening groups of two or more valves to test corresponding groups of two or more suction cups in parallel.

9. The system of claim 1, further comprising a robotic manipulator coupled to the suction gripper, wherein the functions further comprise causing the robotic manipulator to move the at least two suction cups of the suction gripper onto the object in order to cause the robotic manipulator to move the object with the suction gripper.

10. The system of claim 9, further comprising at least one optical sensor, wherein the functions further comprise determining the at least two suction cups based on optical sensor data from the at least one optical sensor indicative of the object.

11. The system of claim 10, wherein the functions further comprise:
determining at least one surface quality metric indicative of expected suction cup performance on at least one surface of the object based on the optical sensor data; and
using the at least one surface quality metric to determine the at least two suction cups.

12. The system of claim 9, wherein the functions further comprise:
determining a total amount of force applied by the suction gripper to the object based on the received sensor data; and
based on the total amount of force applied by the suction gripper to the object, determine a trajectory to cause the robotic manipulator to move the object with the suction gripper in a manner estimated to maintain suction with the object.

13. The system of claim 12, further comprising a force-torque sensor coupled to the robotic manipulator, wherein the functions further comprise:
receiving sensor data from the force-torque sensor indicative of at least one force on the suction gripper; and
using the sensor data received from the force-torque sensor to determine the trajectory to cause the robotic manipulator to move the object with the suction gripper in a manner estimated to maintain suction with the object.

14. The system of claim 1, the functions further comprising:
determining a set of one or more open valves for the suction gripper to grip the object; and
using the set of one or more open valves for the suction gripper to grip a second object of a same type as the object.

15. The system of claim 1, the functions further comprising:
  using the received sensor data to identify a predetermined number of suction cups to deactivate that have lowest respective vacuum pressures among the at least two suction cups.

16. The system of claim 15, wherein the predetermined number of suction cups to deactivate is two suction cups.

17. The system of claim 1, the functions further comprising:
  determining that at least one identified suction cup is in contact with a particular surface of the object; and
  closing at least one additional open valve that corresponds to at least one additional suction cup that is in contact with the particular surface.

18. A computer-implemented method, comprising:
  opening at least two valves corresponding to at least two suction cups of a suction gripper;
  activating a vacuum pump to cause a suction gripper to apply suction to an object through the at least two suction cups of the suction gripper;
  while the at least two valves corresponding to the at least two suction cups are open, receiving sensor data indicative of respective vacuum pressures of the at least two suction cups from at least two sensors corresponding to the at least two suction cups, wherein a sensor is positioned between the vacuum pump and a corresponding one of the suction cups and indicates the vacuum pressure of the corresponding one of the suction cups;
  based on the received sensor data, comparing, by a computing device, the respective vacuum pressures of the at least two suction cups with one another to identify at least one suction cup from the at least two suction cups with at least one lowest respective vacuum pressure among the at least two suction cups; and
  closing at least one of the open valves that corresponds to the at least one identified suction cup.

19. The method of claim 18, further comprising:
  using the respective vacuum pressures of the at least two suction cups to predict an amount of gripping force that will be applied by the suction gripper to the object when the suction gripper has a plurality of different combinations of open valves; and
  identifying the at least one suction cup to maximize the predicted amount of gripping force applied by the suction gripper to the object.

20. The method of claim 18, further comprising identifying the at least one suction cup by identifying one or more suction cups with a vacuum pressure below a threshold level of vacuum pressure.

21. A non-transitory computer-readable medium having stored therein instructions, that when executed by a computing system, cause the computing system to perform functions comprising:
  opening at least two valves corresponding to at least two suction cups of a suction gripper;
  activating a vacuum pump to cause a suction gripper to apply suction to an object through the at least two suction cups of the suction gripper;
  while the at least two valves corresponding to the at least two suction cups are open, receiving sensor data indicative of respective vacuum pressures of the at least two suction cups from at least two sensors corresponding to the at least two suction cups, wherein a sensor is positioned between the vacuum pump and a corresponding one of the suction cups and indicates the vacuum pressure of the corresponding one of the suction cups;
  using the respective vacuum pressures of the at least two suction cups to predict an amount of gripping force that will be applied by the suction gripper to the object when the suction gripper has a plurality of different combinations of open valves;
  identifying, by a computing device, at least one open valve to close to cause the suction gripper to have a combination of open valves that maximizes the predicted amount of gripping force that will be applied by the suction gripper to the object; and
  closing the at least one identified open valve.

22. The non-transitory computer-readable medium of claim 21, the functions further comprising:
  causing a robotic manipulator coupled to the suction gripper to move the object through a trajectory;
  determining a plurality of combinations of open valves that maximizes the predicted amount of gripping force that will be applied by the suction gripper to the object at a plurality of points of the trajectory; and
  adjusting one or more of the valves at the plurality of points of the trajectory to cause the suction gripper to use the determined plurality of combinations of open valves to grip the object while moving the object through the trajectory.

* * * * *